(12) United States Patent
Krishnamoorthy et al.

(10) Patent No.: US 11,573,775 B2
(45) Date of Patent: Feb. 7, 2023

(54) SOFTWARE CODE CONVERTER FOR RESOLVING REDUNDANCY DURING CODE DEVELOPMENT

(71) Applicant: BANK OF AMERICA CORPORATION, Charlotte, NC (US)

(72) Inventors: Madhusudhanan Krishnamoorthy, Chennai (IN); Samrat Bhasin, Bangalore (IN); Prince Noel Pradeep Santhappa Durai, Chennai (IN); Vaasudevan Sundaram, Chennai (IN); Srinath M R, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 210 days.

(21) Appl. No.: 16/919,923

(22) Filed: Jul. 2, 2020

(65) Prior Publication Data
US 2021/0397423 A1    Dec. 23, 2021

Related U.S. Application Data

(63) Continuation of application No. 16/903,660, filed on Jun. 17, 2020, now Pat. No. 11,347,500, and a continuation of application No. 16/903,581, filed on Jun. 17, 2020.

(51) Int. Cl.
| | |
|---|---|
| G06F 8/40 | (2018.01) |
| G06N 3/08 | (2006.01) |
| G06F 8/71 | (2018.01) |
| G06F 8/72 | (2018.01) |
| G06F 8/75 | (2018.01) |

(52) U.S. Cl.
CPC ............... G06F 8/40 (2013.01); G06F 8/71 (2013.01); G06F 8/72 (2013.01); G06N 3/08 (2013.01); *G06F 8/75* (2013.01)

(58) Field of Classification Search
None
See application file for complete search history.

(56) References Cited

U.S. PATENT DOCUMENTS

| | | |
|---|---|---|
| 8,356,231 B2 | 1/2013 | Cornwell et al. |
| 8,441,488 B2 | 5/2013 | Kota et al. |
| 8,458,678 B2 | 6/2013 | Meijer et al. |
| 8,601,497 B2 | 12/2013 | Craddock et al. |
| 8,700,917 B2 | 4/2014 | Takashima |
| 8,704,687 B2 | 4/2014 | Clissold et al. |

(Continued)

OTHER PUBLICATIONS

B. Du, W. Xiong, J. Wu, L. Zhang, L. Zhang and D. Tao, "Stacked Convolutional Denoising Auto-Encoders for Feature Representation," in IEEE Transactions on Cybernetics, vol. 47, No. 4, pp. 1017-1027, Apr. 2017, doi: 10.1109/TCYB.2016.2536638. (Year: 2017).*

(Continued)

*Primary Examiner* — Jason D Mitchell

(57) ABSTRACT

A code converter uses machine learning to determine conflicts and redundancies in software code. Generally, the code converter uses machine learning to convert software code into vectors that represent the code. These vectors may then be compared with other vectors to determine similarities between code. The similarities may be used to detect conflicts and/or redundancies created during the development process (e.g., when a developer attempts to change the code).

12 Claims, 7 Drawing Sheets

(56) References Cited

U.S. PATENT DOCUMENTS

| | | | |
|---|---|---|---|
| 8,707,281 | B2 | 4/2014 | Luszczek et al. |
| 8,776,026 | B2 | 7/2014 | Candea et al. |
| 8,850,416 | B1 | 9/2014 | Colton et al. |
| 8,938,727 | B2 | 1/2015 | Asipov et al. |
| 8,964,469 | B2 | 2/2015 | Cornwell et al. |
| 8,966,457 | B2 | 2/2015 | Ebcioglu et al. |
| 9,003,166 | B2 | 4/2015 | Sinha et al. |
| 9,015,678 | B2 | 4/2015 | Aoyama et al. |
| 9,043,816 | B2 | 5/2015 | Brown |
| 9,247,195 | B2 | 1/2016 | Huang |
| 9,251,330 | B2 | 2/2016 | Boivie et al. |
| 9,298,469 | B2 | 3/2016 | Busaba et al. |
| 9,405,899 | B2 | 8/2016 | Khesin |
| 9,407,942 | B2 | 8/2016 | Brenneman |
| 9,483,335 | B1 | 11/2016 | Wagner |
| 9,501,272 | B2 | 11/2016 | Kiaie et al. |
| 9,602,549 | B2 | 3/2017 | Boyer et al. |
| 9,645,803 | B2 | 5/2017 | Wright et al. |
| 9,727,903 | B2 | 8/2017 | DePoy |
| 9,729,381 | B2 | 8/2017 | Hancock et al. |
| 9,747,614 | B2 | 8/2017 | Antonucci |
| 9,823,900 | B2 | 11/2017 | Ouali |
| 10,122,178 | B2 | 11/2018 | Sachs et al. |
| 10,217,182 | B1 | 2/2019 | Holub et al. |
| 10,233,214 | B2 | 3/2019 | Greiner et al. |
| 10,402,176 | B2 | 9/2019 | Glossop et al. |
| 10,402,547 | B2 | 9/2019 | Joseph Johnson et al. |
| 10,404,074 | B2 | 9/2019 | Lucas et al. |
| 10,503,908 | B1* | 12/2019 | Bellis ............... G06F 16/90335 |
| 10,581,888 | B1* | 3/2020 | Agranonik .......... H04L 63/1425 |
| 10,754,641 | B2* | 8/2020 | Chen ..................... G06N 20/00 |
| 10,996,930 | B1* | 5/2021 | Wilson-Thomas ....... G06F 8/33 |
| 11,216,510 | B2* | 1/2022 | Jiang .................. G06N 3/0454 |
| 11,347,500 | B2* | 5/2022 | Krishnamoorthy ...... G06N 3/08 |
| 2015/0089339 | A1 | 3/2015 | Hirsch et al. |
| 2015/0143395 | A1 | 5/2015 | Reisman |
| 2015/0356561 | A1 | 12/2015 | Chang et al. |
| 2016/0328643 | A1* | 11/2016 | Liu ..................... G06N 3/0454 |
| 2017/0054781 | A1 | 2/2017 | Liwerant et al. |
| 2017/0139705 | A1* | 5/2017 | Grisa ....................... G06F 8/72 |
| 2018/0004721 | A1 | 1/2018 | Wolfram et al. |
| 2018/0089530 | A1* | 3/2018 | Liu ....................... G06T 7/0012 |
| 2018/0276105 | A1* | 9/2018 | Srinivasan ............. G06N 20/00 |
| 2018/0284928 | A1 | 10/2018 | Kremin |
| 2019/0044959 | A1* | 2/2019 | Chen ..................... G06N 20/00 |
| 2019/0079741 | A1* | 3/2019 | Makkar ..................... G06F 8/75 |
| 2019/0391792 | A1* | 12/2019 | Sabharwal ............... G06N 3/08 |
| 2020/0034401 | A1 | 1/2020 | Scannell, Jr. |
| 2020/0057850 | A1* | 2/2020 | Kraus ...................... G06N 3/08 |
| 2020/0117445 | A1* | 4/2020 | Wilson ................ G06F 16/284 |
| 2020/0133888 | A1 | 4/2020 | Murray et al. |
| 2020/0184016 | A1* | 6/2020 | Roller ...................... G06N 3/08 |
| 2020/0336802 | A1* | 10/2020 | Russell ................. G06V 10/82 |
| 2020/0341755 | A1* | 10/2020 | Woulfe ..................... G06F 8/77 |
| 2020/0371778 | A1* | 11/2020 | Ni ............................. G06F 8/70 |
| 2021/0012215 | A1* | 1/2021 | Fei ......................... G06F 40/30 |
| 2021/0034784 | A1* | 2/2021 | Baughman ............. G06F 21/64 |
| 2021/0081876 | A1* | 3/2021 | Gardner ................ G06Q 10/10 |
| 2021/0158210 | A1* | 5/2021 | Kalluri ................ G06F 16/3347 |
| 2021/0191715 | A1* | 6/2021 | Samudrala ................ G06F 8/71 |
| 2021/0232918 | A1* | 7/2021 | Cheng ..................... G06N 3/04 |
| 2021/0373883 | A1* | 12/2021 | Samudrala ................ G06F 8/71 |
| 2021/0382709 | A1* | 12/2021 | Sagal ........................ G06F 8/71 |
| 2021/0390683 | A1* | 12/2021 | Park ......................... G06N 5/04 |
| 2021/0397421 | A1* | 12/2021 | Krishnamoorthy ....... G06F 8/30 |
| 2021/0397422 | A1* | 12/2021 | Krishnamoorthy ...... G06N 3/08 |
| 2021/0397423 | A1* | 12/2021 | Krishnamoorthy ....... G06F 8/40 |
| 2022/0035602 | A1* | 2/2022 | Elango ................... G06F 8/433 |

OTHER PUBLICATIONS

U.S. Appl. No. 16/903,581, filed Jun. 17, 2020, Krishnamoorthy et al.

U.S. Appl. No. 16/903,660, filed Jun. 17, 2020, Krishnamoorthy et al.

\* cited by examiner

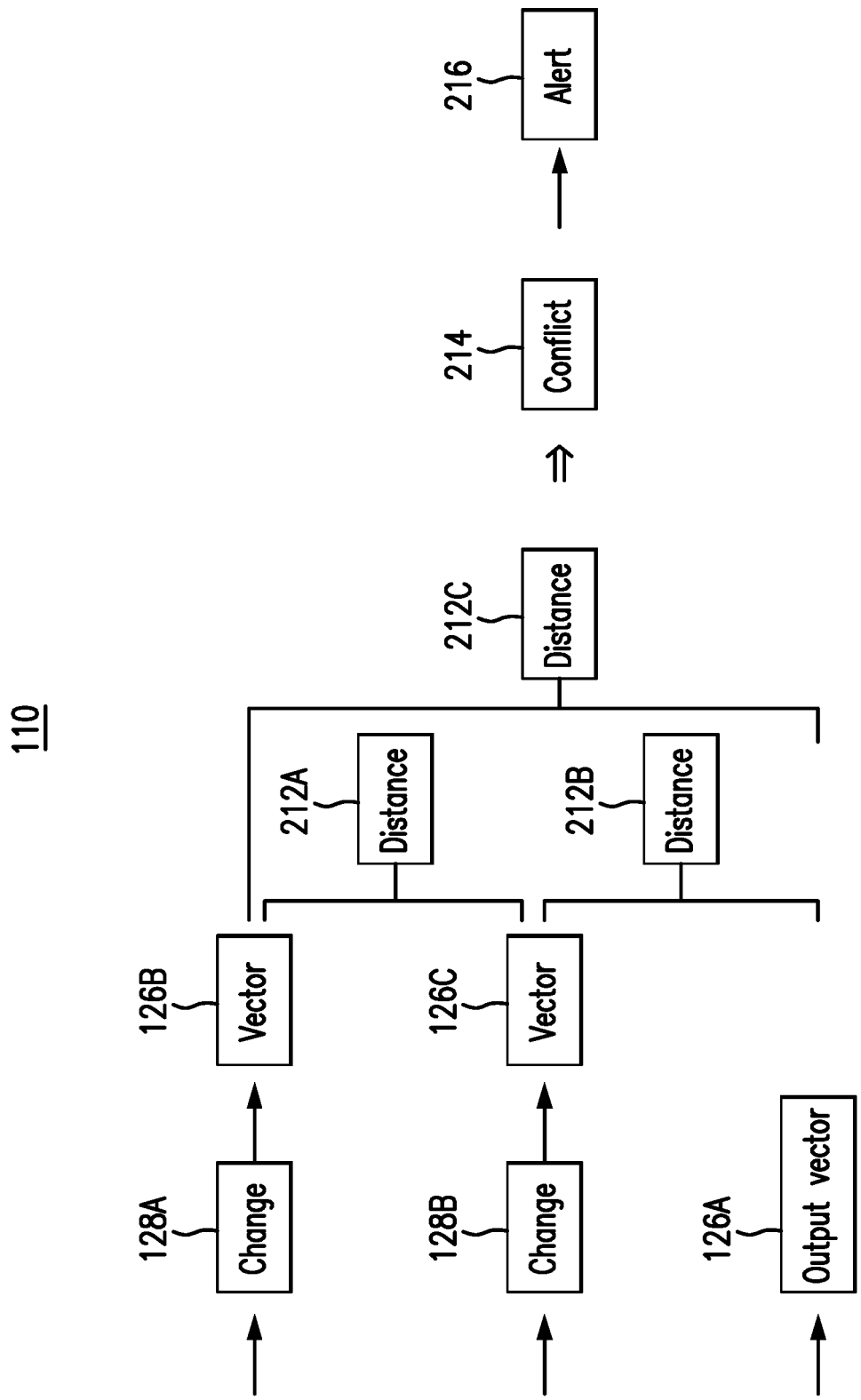

SOFTWARE CODE CONVERTER FOR RESOLVING REDUNDANCY DURING CODE DEVELOPMENT

CROSS-REFERENCE TO RELATED APPLICATIONS

This application is a continuation of U.S. patent application Ser. No. 16/903,581, filed Jun. 17, 2020 and entitled "SOFTWARE CODE VECTORIZATION CONVERTER" and U.S. patent application Ser. No. 16/903,660, filed Jun. 17, 2020 and entitled "SOFTWARE CODE CONVERTER FOR RESOLVING CONFLICTS DURING CODE DEVELOPMENT."

TECHNICAL FIELD

This disclosure relates generally to software code development.

BACKGROUND

Software applications are developed by writing software code.

SUMMARY OF THE DISCLOSURE

Software applications are developed by writing software code. Several different developers may be involved simultaneously in the development of the code, with each developer responsible for writing code for a different portion of the application. A version of the code is typically held in a repository. When a developer wants to change a portion of the code, the developer retrieves the portion of code from the repository and implements the changes. The developer then stores the changed code in the repository to fully implement the changes.

This process of developing software code causes certain technical problems to occur. For example, if two developers try to make different changes to the same portion of code at the same time, a conflict may be created that causes that portion of code to not function properly. As another example, if a developer changes a feature of the software application, but forgets that that same feature is implemented in other places in the software code, then that feature may begin functioning inappropriately or inconsistently. As yet another example, if two developers are implementing the same feature in two different portions of code, they may create a redundancy that may result in the feature functioning inconsistently and/or inappropriately.

This disclosure contemplates a code converter that uses machine learning to determine conflicts and redundancies in software code. Generally, the code converter uses machine learning to convert software code into vectors that represent the code. These vectors may then be compared with other vectors to determine similarities between code. The similarities may be used to detect conflicts and/or redundancies created during the development process (e.g., when a developer attempts to change the code). In this manner, the functioning of the software code is improved. For example, by detecting and preventing conflicts and/or redundancies, the software code may function appropriately and consistently in certain embodiments. Certain embodiments are described below.

According to an embodiment, an apparatus includes a memory and a hardware processor communicatively coupled to the memory. The processor parses software code for a software application to identify a plurality of portions of the software code and converts the plurality of portions of the software code into a plurality of tokens that form a numerical representation of the software code. The processor also organizes, using a neural network, the plurality of tokens into a hierarchical structure that represents the software code, the structure comprising a first layer, a second layer, a third layer, and a fourth layer and identifies the first layer as noise. In response to identifying the first layer as noise, the processor removes the first layer from the structure. The processor then converts the second layer into a first vector that comprises a numerical representation of the second layer, converts the third layer into a second vector that comprises a numerical representation of the third layer, and converts the fourth layer into a third vector that comprises a numerical representation of the fourth layer. The processor further determines, by comparing distances between the first, second, and third vectors, that the first vector should be removed and after determining that the first vector should be removed, produces, based on the second and third vectors but not the first vector, an output vector representing the software code.

According to an embodiment, an apparatus includes a memory and a hardware processor communicatively coupled to the memory. The processor parses software code for a software application to identify a plurality of portions of the software code and converts the plurality of portions of the software code into a plurality of tokens that form a numerical representation of the software code. The processor also organizes, using a neural network, the plurality of tokens into a hierarchical structure that represents the software code and converts the structure into an output vector comprising a numerical representation of the software code. The processor then detects a first change to the software code and converts the first change to a first vector comprising a numerical representation of the first change. The processor also detects a second change to the software code and converts the second change to a second vector comprising a numerical representation of the second change. The processor further determines, by comparing the output vector, the first vector, and the second vector, that the first and second changes are conflicting changes to the software code and in response to determining that the first and second changes are conflicting changes, prevents the second change from being implemented in the software code.

According to another embodiment, an apparatus includes a memory and a hardware processor communicatively coupled to the memory. The processor parses software code for a software application to identify a plurality of portions of the software code and converts the plurality of portions of the software code into a plurality of tokens that form a numerical representation of the software code. The processor organizes, using a neural network, the plurality of tokens into a hierarchical structure that represents the software code and converts the structure into an output vector comprising a numerical representation of the software code. The processor also detects a first change to the software code and converts the first change to a first vector comprising a numerical representation of the first change. The processor then uses the output vector and the first vector to determine that a second change corresponding to the first change should be made to the software code and communicates an alert that the second change should be made to the software code.

Certain embodiments provide one or more technical advantages. For example, an embodiment reduces the inappropriate and inconsistent functioning of a software application by detecting and preventing conflicts and redundancies during the software development process through an automatic, machine learning process. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which:

FIGS. 2A-2C illustrate an example code converter in the system of FIG. 1; and

DETAILED DESCRIPTION

Embodiments of the present disclosure and its advantages are best understood by referring to FIGS. 1 through 3C of the drawings, like numerals being used for like and corresponding parts of the various drawings.

Software applications are developed by writing software code. Several different developers may be involved simultaneously in the development of the code, with each developer responsible for writing code for a different portion of the application. A version of the code is typically held in a repository. When a developer wants to change a portion of the code, the developer retrieves the portion of code from the repository and implements the changes. The developer then stores the changed code in the repository to fully implement the changes.

This process of developing software code causes certain technical problems to occur. For example, if two developers try to make different changes to the same portion of code at the same time, a conflict may be created that causes that portion of code to not function properly. As another example, if a developer changes a feature of the software application, but forgets that that same feature is implemented in other places in the software code, then that feature may begin functioning inappropriately or inconsistently. As yet another example, if two developers are implementing the same feature in two different portions of code, they may create a redundancy that may result in the feature functioning inconsistently and/or inappropriately.

This disclosure contemplates a code converter that uses machine learning to determine conflicts and redundancies in software code. Generally, the code converter uses machine learning to convert software code into vectors that represent the code. These vectors may then be compared with other vectors to determine similarities between code. The similarities may be used to detect conflicts and/or redundancies created during the development process (e.g., when a developer attempts to change the code). In this manner, the functioning of the software code is improved. For example, by detecting and preventing conflicts and/or redundancies, the software code may function appropriately and consistently in certain embodiments.

A practical application of the code converter is that the code converter reduces the number of conflicts and redundancies during the software development process in certain embodiment. The code converter uses an unconventional machine learning process to detect and resolve conflicts and redundancies before they impact the software code in a central repository. The system will be described in more detail using FIGS. 1 through 3C.

Figure 1:
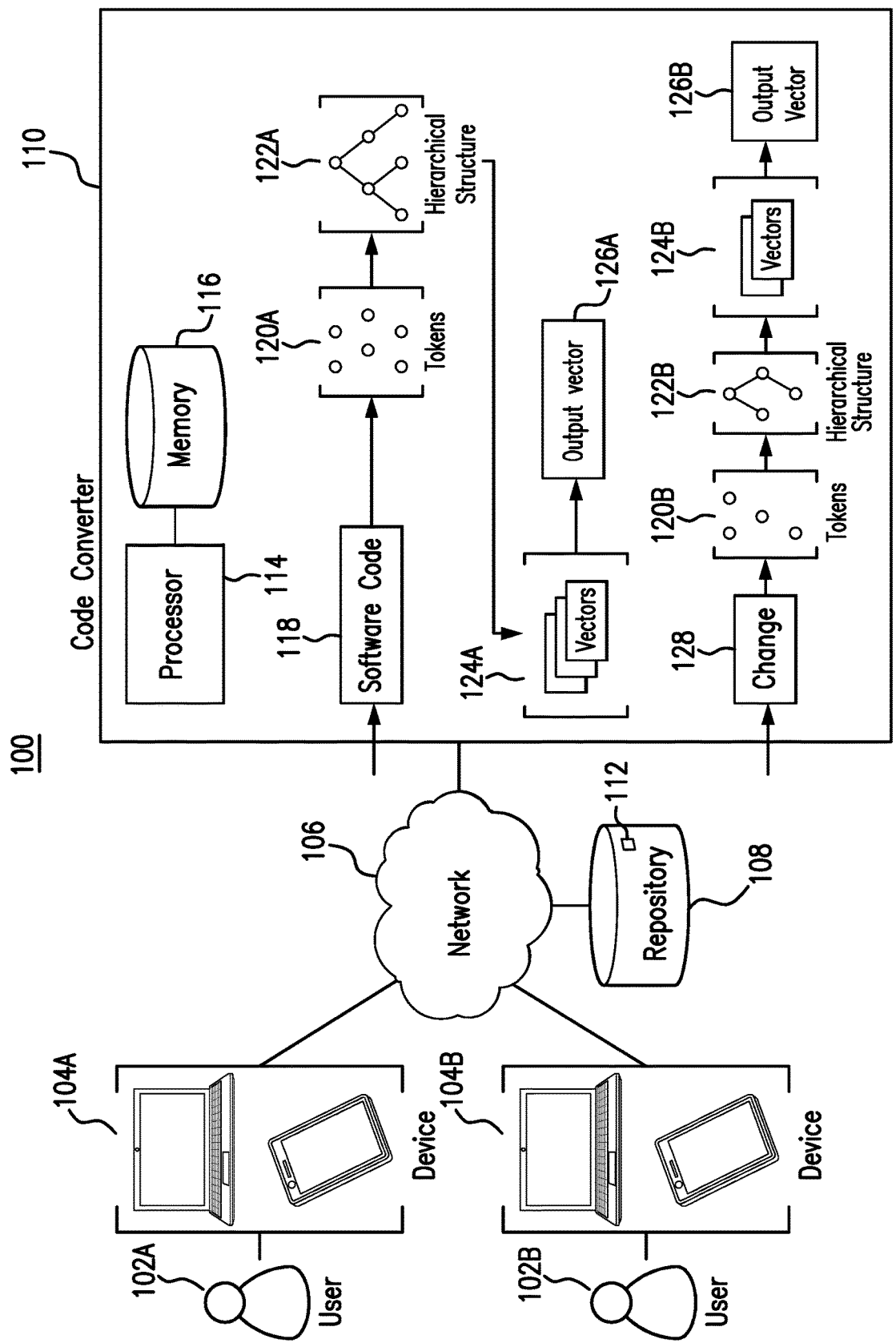
FIG. 1 illustrates an example system.

FIG. 1 an example system 100. As seen in FIG. 1, system 100 includes one or more devices 104, a network 106, a repository 108, and a code converter 110. Generally, system 100 vectorizes software code for a software application and changes to that software code. These vectors may then be compared to detect conflicts and redundancies during the development of the software code. In particular embodiments, system 100 reduces the number of conflicts and redundancies during software code development, which reduces the number of bugs in the software code and improves the overall performance of the software code when executed.

Users 102 use one or more devices 104 to develop software code for software applications and to communicate with other components of system 100. In the example of FIG. 1, system 100 includes a user 102A that uses one or more devices 104A and a user 102B that uses one or more devices 104B. System 100 may include any suitable number of users 102 using any suitable number of devices 104. Users 102 may use devices 104 to develop software code in any suitable programming language.

During development of software code, user 102A and user 102B may make changes to the software code without coordinating these changes with one another. As a result, certain technical issues may be created, such as conflicts and redundancies. For example, user 102A and user 102B may simultaneously change the same piece of software code in different ways. As a result, the software code may operate or function inappropriately when executed. User 102A may intend the software code to function in one way while user 102B intends the software code to operate in another way. These conflicting desires may result in changes to the software code that conflict with one another. In certain instances, the software code may end up functioning in a way that is undesired by both user 102A and user 102B.

As another example, user 102A may change the software code for a particular feature of the software application. However, user 102A may not know that the same feature has been implemented in another portion of the software code. As a result, the same feature may operate or function differently, depending on which portion of the software code is called. User 102B may even implement a change to the feature in the other portion of the software code, which results in even further inconsistent behavior in the same feature.

As yet another example, user 102A and user 102B may develop software code to implement the same feature at the same time. Although these changes may not conflict with one another (e.g., because user 102A and user 102B are implementing the same feature), these changes may end up being redundant in the software code, which may result in portions of the software code not being executed or being wasted. In certain instances, the redundancies cause the software code to occupy more storage space than actually needed in the system 100 which reduces the performance of the system 100.

Devices 104 include any appropriate device for communicating with components of system 100 over network 106. For example, devices 104 may be a telephone, a mobile phone, a computer, a laptop, a tablet, an automated assistant, and/or a cash register. This disclosure contemplates device 104 being any appropriate device for sending and receiving communications over network 106. As an example and not by way of limitation, device 104 may be a computer, a laptop, a wireless or cellular telephone, an electronic notebook, a personal digital assistant, a tablet, or any other device capable of receiving, processing, storing, and/or communicating information with other components of system 100. Device 104 may also include a user interface, such as a display, a microphone, keypad, or other appropriate terminal equipment usable by user 102. Device 104 may include a hardware processor, memory, and/or circuitry configured to perform any of the functions or actions of device 104 described herein. For example, a software application designed using software code may be stored in the memory and executed by the processor to perform the functions of device 104.

Network 106 allows communication between and amongst the various components of system 100. For example, user 102 may use devices 104 to communicate over network 106. This disclosure contemplates network 106 being any suitable network operable to facilitate communication between the components of system 100. Network 106 may include any interconnecting system capable of transmitting audio, video, signals, data, messages, or any combination of the preceding. Network 106 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Repository 108 stores software code for software application 112. The software code may be stored in any suitable number of files and/or folders. Users 102 may make changes to the software code by retrieving a copy of the software code from repository 108 and changing that software code on devices 104. After the changes have been complete, users 102 may store the changed software code back into repository 108. The software code in repository 108 may be compiled and/or used to build software application 112.

This disclosure contemplates code converter 110 vectorizing software code and changes to that software code to detect conflicts and redundancies. Code converter 110 may resolve these conflicts and redundancies, which reduces the number of bugs and/or inconsistent behavior in the software code. In particular embodiments, code converter 110 improves the operation and performance of the software code when executed. As seen in the example of FIG. 1, code converter 110 includes a processor 114 and a memory 116. This disclosure contemplates processor 114 and memory 116 being configured to perform any of the functions of code converter 110 described herein.

Processor 114 is any electronic circuitry, including, but not limited to microprocessors, application specific integrated circuits (ASIC), application specific instruction set processor (ASIP), and/or state machines, that communicatively couples to memory 116 and controls the operation of code converter 110. Processor 114 may be 8-bit, 16-bit, 32-bit, 64-bit or of any other suitable architecture. Processor 114 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 114 may include other hardware that operates software to control and process information. Processor 114 executes software stored on memory to perform any of the functions described herein. Processor 114 controls the operation and administration of code converter 110 by processing information received from devices 104, network 106, and memory 116. Processor 114 may be a programmable logic device, a microcontroller, a microprocessor, any suitable processing device, or any suitable combination of the preceding. Processor 114 is not limited to a single processing device and may encompass multiple processing devices.

Memory 116 may store, either permanently or temporarily, data, operational software, or other information for processor 114. Memory 116 may include any one or a combination of volatile or non-volatile local or remote devices suitable for storing information. For example, memory 116 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 116, a disk, a CD, or a flash drive. In particular embodiments, the software may include an application executable by processor 114 to perform one or more of the functions described herein.

Code converter 110 retrieves software code 118 from repository 108. Software code 118 may be the code for a software application 112. Software code 118 may be in any suitable programming language. Code converter 110 converts software code 118 to one or more tokens 120A. In certain embodiments, code converter 110 may perform this conversion by parsing software code 118 to detect one or more portions of software code 118. Each of these portions is then converted into a token 120A. Each token 120A includes a numerical representation of the portion of software code 118.

Code converter 110 then arranges tokens 120A into a hierarchal structure 122A. In certain embodiments, code converter 110 uses a neural network to examine and organize tokens 120A into hierarchal structure 122A. Hierarchical structure 122A may be any suitable structure (e.g., a tree or graph) that represents the flow of software code 118. For example, tokens 120A may be organized in hierarchal structure 122A in a manner that represents the flow through the portions of software code 118 represented by tokens 120A. In the example of FIG. 1, hierarchal structure 122A uses tokens 122A as nodes of a tree. The flow of software code 118 is represented in the arrangement of this tree. For example, the flow of software code 118 may start at a node at the top of the tree and branch downwards.

Hierarchal structure 122A may include one or more layers. In the example of FIG. 1, the tree structure includes three or more horizontal layers. Each layer represents a portion of the flow through software code 118. Code converter 110 converts each of these layers of the hierarchal structure 122A into vectors 124A. This disclosure contemplates hierarchal structure 122A including any suitable number of layers arranged in any suitable structure. For example, the layers may be vertical layers, horizontal layers, diagonal layers, or a mixed assortment of nodes of hierarchal structure 122A.

Vectors 124A include numerical representations of one or more layers of hierarchal structure 122A. Each vector 124A may represent a particular layer of hierarchal structure 122A. The more similar one layer is to another layer, the closer the vectors 124A for those layers are to each other.

Thus, if a layer of hierarchal structure 122A is very different from another layer of hierarchal structure 122A, then the vectors 124A for those two layers will be distant from one another. On the other hand, if a layer of hierarchal structure 122A is very similar to another layer of hierarchal structure 122A, then the vectors 124A for those two layers will be very close to one another. Code converter 110 may analyze vectors 124A to determine a representation for the structure and flow of software code 118.

Code converter 110 generates an output vector 126A based on vectors 124A. Output vector 126A may be a numerical representation of vectors 124A. Code converter 110 may produce output vector 126A using any suitable operation on vectors 124A. For example, output vector 126A may be an average of vectors 124A. As another example, output vector 126A may be a maximum or minimum of vectors 124A. By producing output vector 126A, code converter 110 produces a single vector 126 that represents software code 118. This single vector 126 may be compared with other vectors (e.g., vectors representing other software code 118, other portions of software code 118, and/or changes to software code 118) to determine similarities or differences between software code 118 and other software code or changes to software code 118.

Code converter 110 may receive change 128. Change 128 may be a change to software code 118 that is being implemented by a user 102 on a device 104. Change 128 may change software code 118 such that the functionality of a feature in software application 112 is changed. Code converter 110 converts change 128 into tokens 120B. In certain embodiments, code converter 110 may parse change 128 to determine one or more portions of change 128. These portions may then be converted to tokens 120B that include numerical representations of each of these portions of change 128.

Code converter 110 may use a neural network to analyze and organize tokens 120B into hierarchal structure 122B. Hierarchal structure 122B may represent the structure and flow of change 128. Similar to hierarchal structure 122A, hierarchal structure 122B may include one or more layers that represent the structure and flow of change 128. Code converter 110 converts each of the layers of hierarchal structure 122B into vectors 124B. Vectors 124B may include numerical representations of the layers of hierarchal structure 122B. For example, if two layers of hierarchal structure 122B are similar to one another, then their vectors 124B will be very close to one another. On the other hand, if two layers of hierarchal structure 122B are very different from one another, then their vectors 124B will be very distant from one another.

Code converter 110 generates output vector 126B based on vectors 124B. As with output vector 126A, output vector 126B may be formed using any suitable operation on vectors 124B. For example, output vector 126B may be an average of vectors 124B. As another example, output vector 126B may be a maximum or minimum of vectors 124B. By producing output vector 126B, code converter 110 generates one singular vector 126 that represents change 128. This vector may then be compared with other vectors 126, such as output vector 126A, to determine similarities and differences between change 128 and software code 118 or other changes 128.

Code converter 110 may determine similarities and differences between software code 118 and changes 128 or between different changes 128 by determining distances between their respective output vectors 126. If two output vectors 126 are close to one another, then code converter 110 may determine that the software code 118 or change 128 represented by these output vectors 126 are similar to one another. If these output vectors 126 are very distant from one another, then code converter 110 may determine that the software code 118 or the changes 128 represented by these output vectors 126 are different from one another. Using these distances, code converter 110 determines conflicts and redundancies in certain embodiments. For example, if code converter 110 determines from output vectors 126 that two changes 128 are different from one another but that these changes are being made to the same piece of software code 118, then code converter 110 may detect that a conflict is occurring. In certain embodiments, code converter 110 may resolve the conflict by selecting one of the changes 128 to implement and by alerting the users 102 that the other change 128 is not being implemented. As another example, code converter 110 may detect, based on output vectors 126, that two changes 128 are very similar to one another. As a result, code converter 110 may detect that a redundancy is occurring and prevent one of the changes 128 from being implemented. Code converter 110 may then alert users 102 of the redundancy and prevent one of the changes from being implemented.

In certain embodiments, because vectors 124 and output vectors 126 are numerical representations of software code 118 and/or changes 128, vectors 124 and output vectors 126 are code agnostic. In other words, if two pieces of software code function similarly but are written in two different programming languages, the vectors 126 for these two pieces of software code will be close to one another. In this manner, code converter 110 can compare and analyze different software code regardless of the programming language(s) used to write the software code. Even if two different users 102 are coding in different languages, conflicts and redundancies between their code may still be detected by code converter 110. The operation of code converter 110 will be described in more detail using FIGS. 2A through 2C and FIGS. 3A through 3C.

Figure 2A:
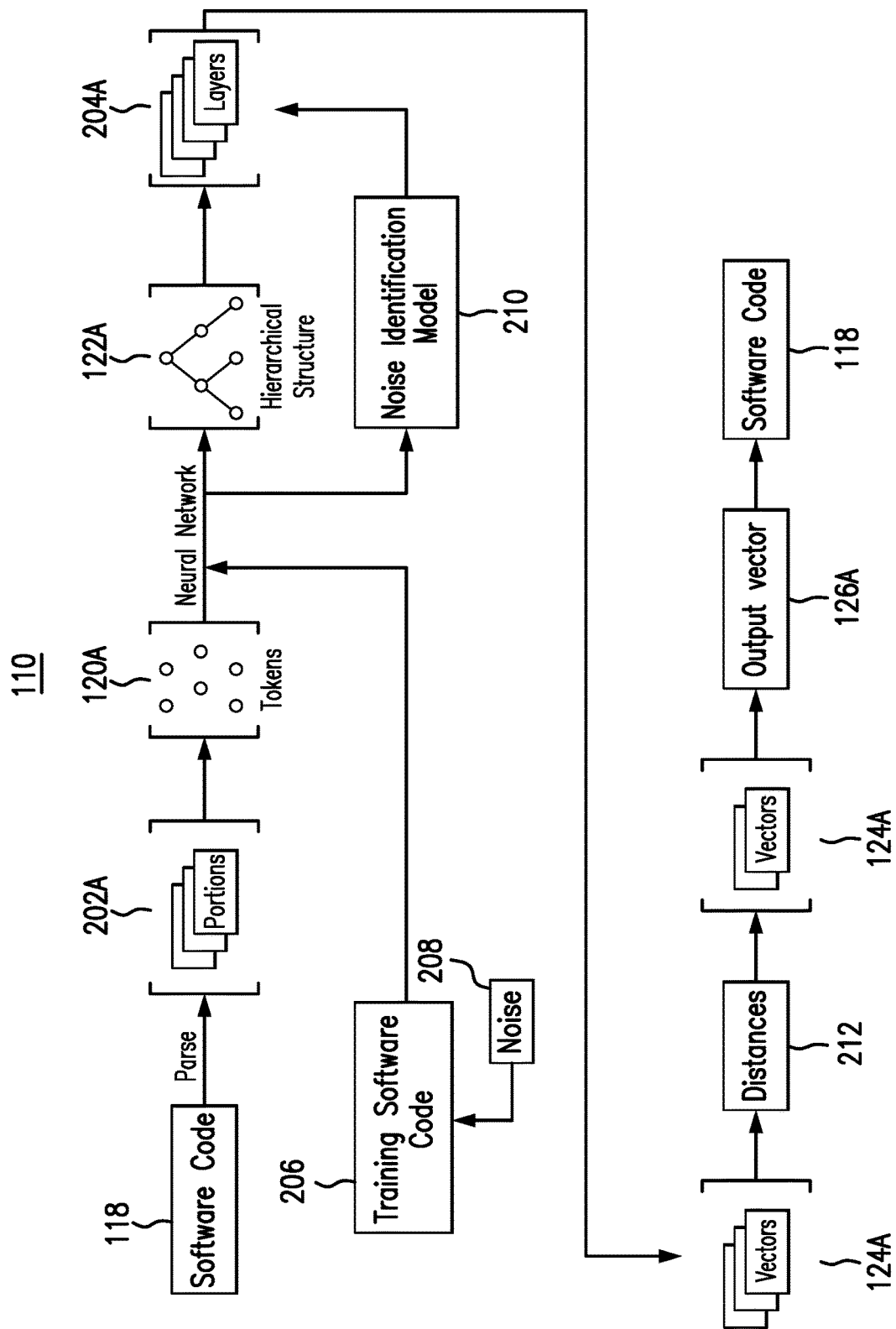
Figure 2C:
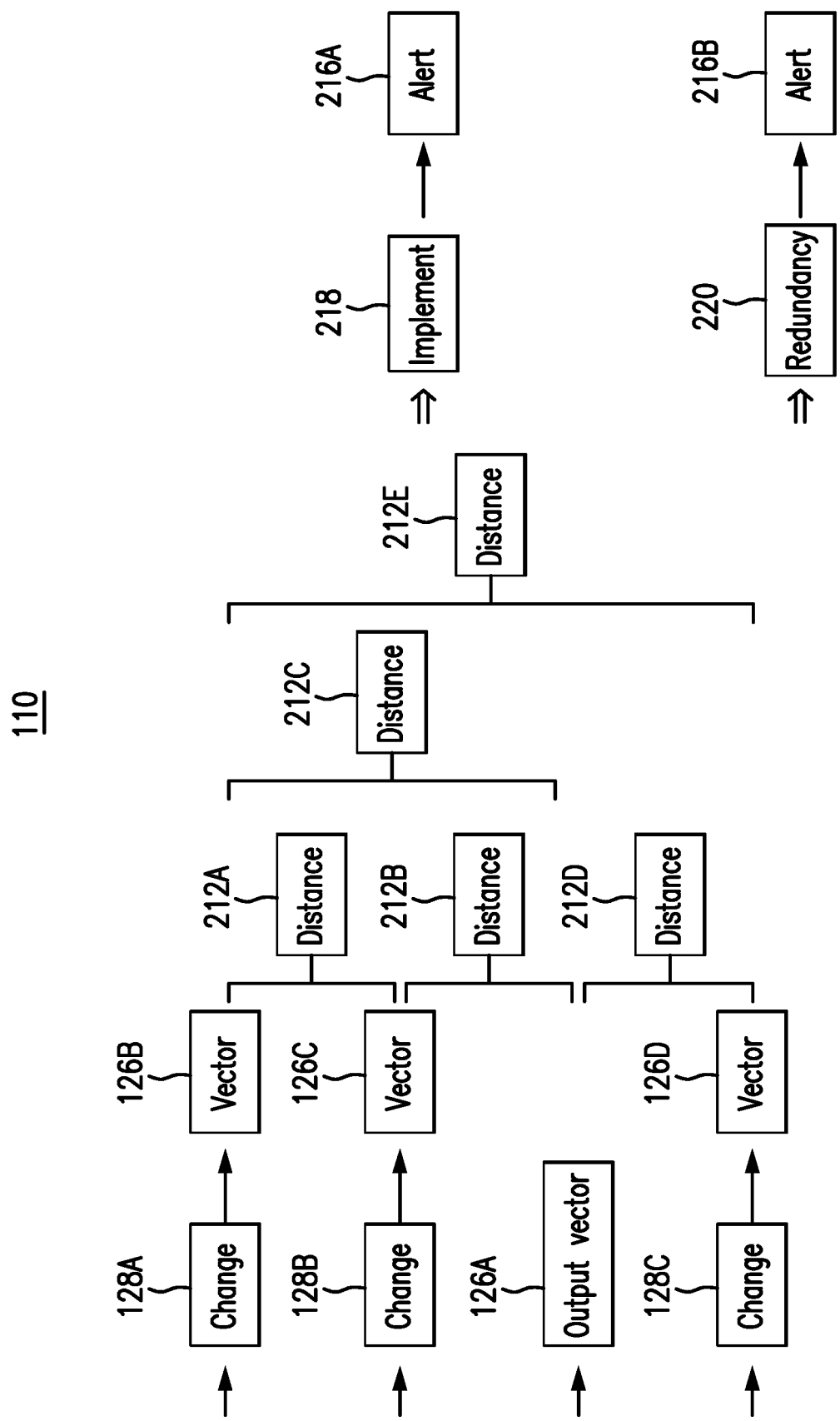

FIGS. 2A through 2C show example operations of code converter 110 in the system 100 of FIG. 1. Although each of these figures show different operation, it is contemplated that these operations may not be performed completely separate, distinct, and/or exclusively from one another. Rather, these operations may be performed in conjunction and/or in combination with one another. In particular embodiments, by performing one or more of the operations shown in FIGS. 2A through 2C, code converter 110 improves the operation of software code 118 by detecting and resolving conflicts and redundancies during the development of software code 118.

FIG. 2A illustrates an example code converter 110 converting software code 118 into output vector 126A. Generally, code converter 110 converts software code 118 into one or more tokens 120A. Code converter 110 then arranges tokens 120A into a hierarchical structure 122A. Code converter 110 then converts one or more layers 204A of hierarchical structure 122A into one or more vectors 124A. Code converter 110 then generates output vector 126A based on the one or more vectors 124A. In particular embodiments, by converting software code 118 into output vector 126A, code converter 110 allows for software code 118 to be quickly and automatically compared with other software code 118 or changes 128 to determine conflicts and redundancies in software code 118.

Code converter 110 receives software code 118. In certain embodiments, code converter 110 retrieves software code 118 from repository 108. Software code 118 may have been placed in repository 108 by a user 102 that develops software code 118. Software code 118 may be written in any suitable language using any suitable device 104.

Code converter 110 parses software code 118 to determine one or more portions 202A. Code converter 110 may parse software code 118 by examining and analyzing the various lines of code in software code 118. The parsing operation may identify various breakpoints within software code 118. These break points may represent distinct functionalities or function blocks within software code 118. Each of these identified portions 202A in software code 118 may represent different functional blocks or groupings within software code 118. These functional blocks may be analyzed to produce output vector 126A. By identifying portions 202A, code converter 110 may identify the functional blocks or functional groupings in software code 118 that distinguish software code 118 from other pieces of software code 118 or changes 128.

Code converter 110 converts portions 202A into tokens 120A. Each token 120A includes a numerical representation of a portion 202A of software code 118. In particular embodiments, code converter 110 may send each portion 202A through a tokenization function (e.g., a hash function) to convert that portion 202A into a token 120A based on the function of that portion 202A. The numerical representation in the token 120A may be generated by the function. Tokens 120A thus form a numerical representation of the functional blocks of software code 118.

Code converter 110 uses a neural network to analyze and organize tokens 120A into hierarchical structure 122A. The neural network may examine software code 118 to determine the flow of software code 118. For example, the neural network may determine the different branch points and function calls that control the flow of software code 118. The neural network then may arrange tokens 120A based on these determined flows to form hierarchical structure 122A. Structure 122A may be any suitable structures such as, for example, a graph or a tree. In the example of FIG. 2A, structure 122A is a tree with various tokens 120A serving as the nodes of the tree. The flow of software code 118 may begin at the top of the tree and flow downwards through one or more tokens 120A representing different functional blocks in software code 118. By arranging tokens 120A into hierarchical structure 122A, code converter 110 creates a structure 122A that represents software code 118.

Structure 122A may include one or more layers 204A. The layers 204A may be any suitable functional division of hierarchical structure 122A. For example, one layer 204 may be a top level of structure 122A and another layer 204A may be a second level of structure 122A. This disclosure contemplate layers 204A being any suitable functional division of structure 122A such as, for example, a horizontal level, a vertical level, and/or an assortment of various nodes.

In particular embodiments, the neural network may be trained to detect noisy code in software code 118. Training software code 206 may be used to train the neural network such that when the neural network analyzes tokens 120A and/or structure 122A, the neural network may identify various portions of tokens 120A and/or structure 122A that are noise and that may be removed from further analysis. Training software code 206 may have noise 208 intentionally added into training software code 206. Noise 208 may include code that is considered redundant, gibberish, and/or unused. By intentionally injecting such noise 208 into training software code 206, the neural network may be trained to identify the noise 208 in a piece of software code 118. After training the neural network, the neural network may produce a noise identification model 210 that may be applied to tokens 120A and/or structure 122A to identify noise in tokens 120A and/or hierarchical structure 122A. In particular embodiments, code converter 110 may train the neural network by converting training software code 206 and/or noise 208 into tokens 120. The tokens 120 may then be arranged into a structure 122. The neural network may then be trained to identify the noise 208 in the tokens 120 or the structure 122 to produce noise identification model 110.

In particular embodiments, code converter 110 may use noise identification model 210 to identify noise in structure 122A and specifically, in layers 204A. For example, noise identification model 210 may be applied to layers 204A to determine that one or more layers 204A are noise. In response, code converter 110 may remove the noisy layers 204A from further consideration. In certain embodiments, by removing layers 204A from further consideration, code converter 110 produces an output vector 126A that more closely represents software code 118. Code converter 110 also improves and speeds up the process by which output vector 126A is generated by removing noisy layers 204A from further consideration, in certain embodiments.

Code converter 110 converts the remaining layers 204A into one or more vectors 124A. In certain embodiments, each remaining layer 204A is converted into a vector 124A. Each vector 124A includes a numerical representation of a layer 204A. In particular embodiments, code converter 110 may input each layer 204A into a vectorization function that converts the layer 204A into a vector 124A. The distance between the vectors 124A indicates the similarities and/or differences between their corresponding layers 204A. For example, if two layers 204A are very similar, then the vectorization function will produce vectors 124A for those layers 204A that are close to each other. On the other hand, if two layers 204A are very different from one another, then the vectorization function will produce vectors 124A for those layers 204A that are very distant from one another.

In certain embodiments, code converter 110 may use the distances 212 between vectors 124A to determine that certain vectors 124A are outliers and should be removed from further consideration. For example, if one vector 124A is very distant from all other vectors 124A, code converter 110 may determine that that distant vector 124A is an outlier and should be removed from further consideration. As a result, code converter 110 may remove one or more vectors 124A based on the distances 212 between vectors 124A. In certain embodiments, by removing outlier vectors 124A, code converter 110 reduces the amount of time it takes to convert software code 118 to output vector 126A. In some embodiments, by removing outlier vectors 124A, code converter 110 produces an output vector 126A that more closely represents software code 118.

Code converter 110 converts the remaining vectors 124A into output vector 126A. Output vector 126A is a single vector that represents software code 118. Code converter 110 may produce output vector 126A based on any suitable operation involving vectors 124A. For example, output vector 126A may be formed by averaging the remaining vectors 124A. As another example, output vector 126A may be produced by taking the maximum and/or minimum of the remaining vectors 124A. Code converter 110 may use output vector 126A as a representation of software code 118. Output vector 126A may be analyzed and/or compared to other output vectors 126 of other software code 118 and/or changes 128 to detect conflicts and/or redundancies.

In certain embodiments, code converter 110 converts output vector 126A back to software code 118. In this manner, the conversion process is a two-way operation such that output vector 126A may be converted back to software code 118. Code converter 110 may perform this reverse conversion using any suitable method. For example, code converter 110 may pass output vector 126A through one or more vectorization and tokenization functions to reverse the process shown in FIG. 2A. As another example, code converter 110 may map output vector 126A to software code 118 in a table. Code converter 110 may then translate output vector 126A back into software code 118 using this translation table.

In some embodiments, output vectors 126 for code written in different languages should be close to one another if the functionality of the code is similar. In this manner, output vectors 126 represent the functionality of software code 118, which may or may not vary based on the programming language selected. Thus, if two users 102 are implementing conflicting or redundant changes in a functional sense but have chosen different programming languages, code converter 110 can still detect the conflict and/or redundancy.

FIG. 2B illustrates an example of code converter 110 using output vectors 126 to detect conflicts. Generally, code converter 110 compares distances 212 between output vectors 126 to determine whether conflicting changes are being made to software code 118. Code converter 110 can resolve the conflicts by preventing certain changes 128 from being implemented. In particular embodiments, code converter 110 improves the operation and functioning of software code 118 by detecting and resolving conflicts.

Code converter 110 receives changes 128A and 128B. Changes 128A and 128B may be provided by users 102 in system 100. For example, a first user 102A may provide change 128A and a second user 102B may provide change 128B. Changes 128A and 128B indicate changes to software code 118 being made by the respective users 102A and 102B. In certain instances, the two users 102A and 102B may be making different changes 128 to the same piece of software code 118. The conflicting changes 128 may cause a conflict in software code 118. For example, if the conflicting changes 128 are not resolved properly, the software code 118 may include a partial version of change 128A and a partial version of change 128B. In some instances, software code 118 may include both changes 128A and 128B, but changes 128A and 128B were not designed to operate together. In these instances, when software code 118 is executed, software code 118 may throw an error and fail to execute.

Code converter 110 attempts to detect and resolve conflicts by converting changes 128 into output vectors 126. In the example of FIG. 2B, change 128A is converted to vector 126B and change 128B is converted to vector 126C. Code converter 110 may convert changes 128 into output vectors 126 using the processes described and shown using FIGS. 1 and 2A. For clarity, that process is not shown in FIG. 2B. Generally, code converter 110 converts changes 128 into vectors 126 by tokenizing changes 128 and then organizing those tokens into a hierarchical structure. The hierarchical structure is then converted into one or more vectors. These vectors are then used to generate output vector 126.

Code converter 110 determines various distances 212 between output vectors 126A, 126B, and 126C. This disclosure contemplates code converter 110 operating on any suitable number of changes 128 and any suitable number of output vectors 126 to determine any suitable number of distances 212. In the example of FIG. 2B, code converter 110 determines a distances 212A between vectors 126B and 126C. Code converter 110 also determines a distance 212B between vectors 126C and 126A and a distance 212C between vectors 126B and 126A. Code converter 110 may determine distances 212 in any suitable manner such as, for example, by calculating a dot product between two vectors 126. These distances 212 reflect the similarity of vectors 126A, 126B and 126C. For example, a change 128A and change 128B are similar to one another when distance 212 is small. However, if change 128A is very different from change 128B, the distance 212A will be very large.

Code converter 110 uses distances 212 to determine whether a conflict 214 is occurring. Conflict 214 would indicate that different changes 128 are being made to the same software code 118 simultaneously. Code converter 110 may determine that conflict 214 is occurring by comparing the various distances 212 between vectors 126. For example, code converter 110 may determine that distance 212A between vectors 126B and 126C is large. However, code converter 110 may also determine that distance 212B and distance 212C are both somewhat small. As a result, code converter 110 may conclude that different changes 128A, 128B are being made to the same software code 118. Code converter 110 may make these determinations by comparing the various distances 212 to one or more thresholds.

Code converter 110 may resolve conflict 214 after detecting conflict 214. For example, code converter 110 may determine that either one of change 128A or change 128B may not be implemented in the software code 118 until the other change 128A or 128B has been implemented in software code 118. By enforcing this ordering of implementing changes 128, code converter 110 prevents a change 128 from being made without first checking to see if that change 128 conflicts with another change 128. In particular embodiments, code converter 110 generates and communicates an alert 216 that indicates the detected conflict 214. Code converter 110 may communicate alert 216 to one or more users 102 that are developing the changes 128 that cause the conflict 214. In this manner, the users 102 may be alerted of the conflict 214 and resolve the conflict 214 between themselves.

In particular embodiments by detecting and resolving conflict 214, code converter 110 improves the operation of software code 118. For example, by resolving 214, code converter 110 prevents bugs or undesired behavior from occurring when software code 118 is executed.

FIG. 2C illustrates an example code converter 110 detecting and resolving redundancies in software code 118. Generally, code converter 110 analyzes output vectors 126 to determine whether redundancies are occurring. Code converter 110 can resolve these redundancies in various manners to improve the operation of software code 118 in particular embodiments. Various examples of redundancies may be resolved by code converter 110. For example, code converter 110 may detect when a change 128 to a feature in software code 118 (e.g., in frontend code) should be accompanied by a corresponding change in another portion of software code 118 (e.g., backend code) because the same feature is also implemented in that portion of software code 118. As another example, code converter 110 may detect when two users 102 are developing code for the same feature but in different portions of software code 118. In that scenario, code converter 110 may instruct one of the users 102 to stop developing the feature to avoid redundant work.

Code converter 110 receives changes 128A, 128B, and 128C in the example of FIG. 2C. Changes 128A, 128B, and 128C may represent changes made to software code 118. Code converter 110 converts these changes 128A, 128B, and 128C into output vectors 126B, 126C, and 126D, respectively. Code converter 110 may follow the processes shown and described using FIGS. 1 and 2A to convert changes 128A, 128B, and 128C to vectors 126B, 126C, and 126D. For example, code converter 110 may tokenize changes 128A, 128B, and 128C and arrange the tokens in a hierarchical structure. Code converter 110 may then convert various layers of the structure into vectors. Code converter 110 may then generate an output vector 126 based on these one or more vectors. For clarity, the process of converting changes 128 into vectors 126 is not illustrated in FIG. 2C.

Code converter 110 determines various distances 212 between output vectors 126. In the example of FIG. 2C, code converter 110 determines a distance 212A between vectors 126B and 126C; a distance 212B between vectors 126C and 126A; a distance 212C between vectors 126B and 126A; a distance 212D between vectors 126D and 126A; and a distance 212E between vectors 126B and 126D. Distances 212 reflect a similarity between changes 128A, 128B, 128C, and/or software code 118. The more similar a change 128 or software code 118 are to each other the shorter the distance 212 is between respective output vectors 126.

Code converter 110 compares one or more distances 212 to detect redundancies in changes 128 and/or software code 118. For example, code converter 110 may examine distances 212A, 212B, and 212C to determine whether a change 128A should be paired with a complementary change 128B. This scenario may arise when software code 118 implements a feature in two different places. When a change 128A is made to the feature in one portion of software code 118, code converter 110 may compare and analyze distances 212 to determine if a similar feature is implemented in another portion of software code 118. By analyzing these distances 212, code converter 110 may determine that change 128A is being made to a feature that is also implemented in another portion of software code 118. As a result, code converter 110 may determine that change 128B should be implemented in the other portion of software code 118 to make a similar change 218 corresponding to change 128A. Code converter 110 may then implement the code change 218. In particular embodiments, code converter 110 may also generate and communicate an alert 216A that indicates that the corresponding change 128B should or has been implemented in software code 118.

As an example, a user 102 may implement a change 128 in software code 118 to change a particular feature in frontend code. That user 102 may not know that the same feature is also implemented in backend code. As a result, if the user 102 did not make a corresponding change in the backend code, then the feature may operate inconsistently depending on whether frontend code or backend code is called. Code converter 110 can vectorize the change 128 and compare distances 212 to output vector 126A representing software code 118. Code converter 110 may determine that based on distances 212 and the content of output vector 126A that the same feature is also implemented in backend code and that a corresponding change 128B should be implemented so that the feature in the frontend code and the feature in the backend code operate consistently. Code converter 110 may then implement the corresponding change 128B and generate and communicate an alert 216A to the user 102 to indicate the corresponding change 128B to be made to the backend code. In this manner, code converter 110 improves the operation of software code 118 by removing inconsistent behavior.

Code converter 110 may also analyze distances 212 to determine when a redundancy in changes are being made. In the above FIG. 2C, code converter 110 may analyze distances 212C, 212D, and 212E to determine whether changes 128A and 128C are redundant of one another. For example, code converter 110 may determine that changes 128A and 128C are redundant of one another when distances 212C and 212D are very similar to one another. If distances 212C and 212D are similar to one another, code converter 110 may determine that a redundancy 220 exists. In response, code converter 110 may determine that either one of change 128A and change 128C should not be implemented in software code 118. Code converter 110 may then prevent one or more changes 128A and 128C from being implemented. In particular embodiments, code converter 110 may also generate and communicate alert 216B to users 102 to indicate the redundancy 220. As a result the users 102 may resolve the redundancy 220 between themselves.

As an example, a user 102 may be implementing a feature in software code 118 by making change 128A. At the same time, another user 102 may be implementing a similar feature by making a change 128C in another section of software code 118. Even though the two changes 128A and 128C are not conflicting, because the features being implemented are very similar, code converter 110 may determine that a redundancy 220 exists because one user 102 can implement the feature while the other user 102 can be implementing a different feature. Code converter 110 may examine distance 212E to determine that changes 128A and 128C are very similar. As a result, code converter 110 may resolve this redundancy 220 by instructing one of the users 102 to stop implementing one of the changes 128. In this manner, code converter 110 detects and resolves redundancy 220 thereby improving the operation of software code 118.

Figure 3A:
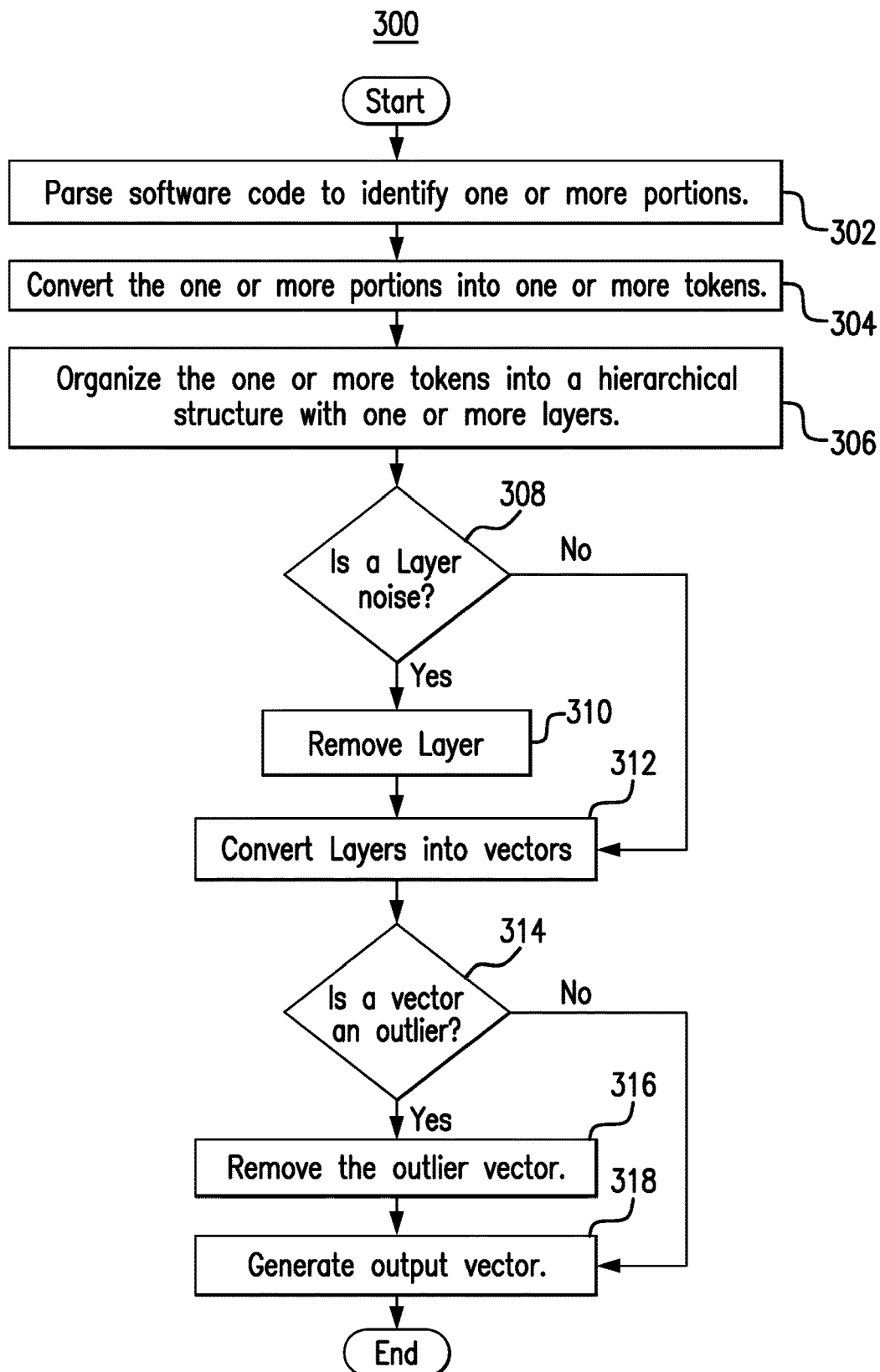
FIGS. 3A-3C are flowcharts illustrating methods of using the code converter of the system of FIG. 1.
Figure 3B:
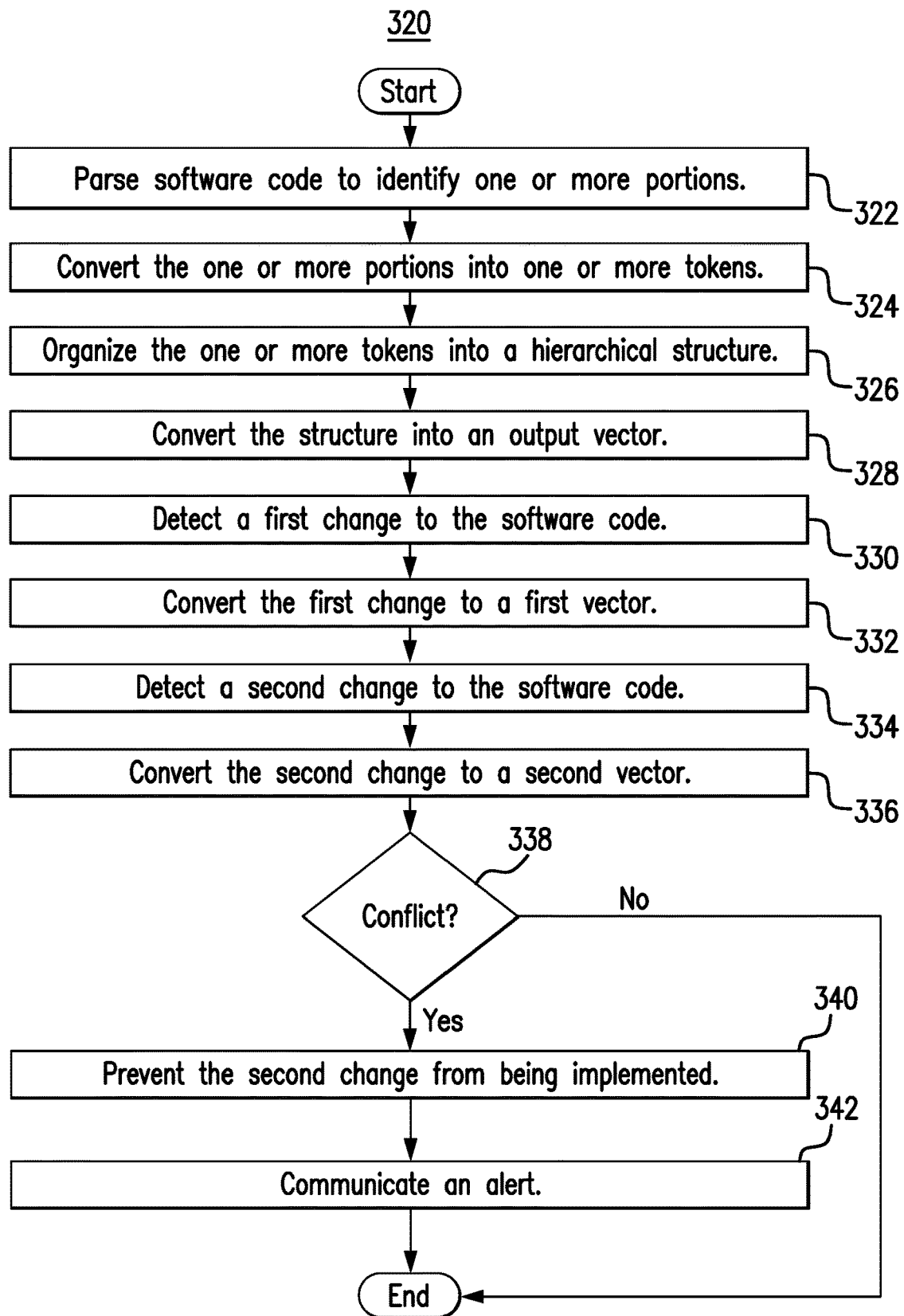
Figure 3C:
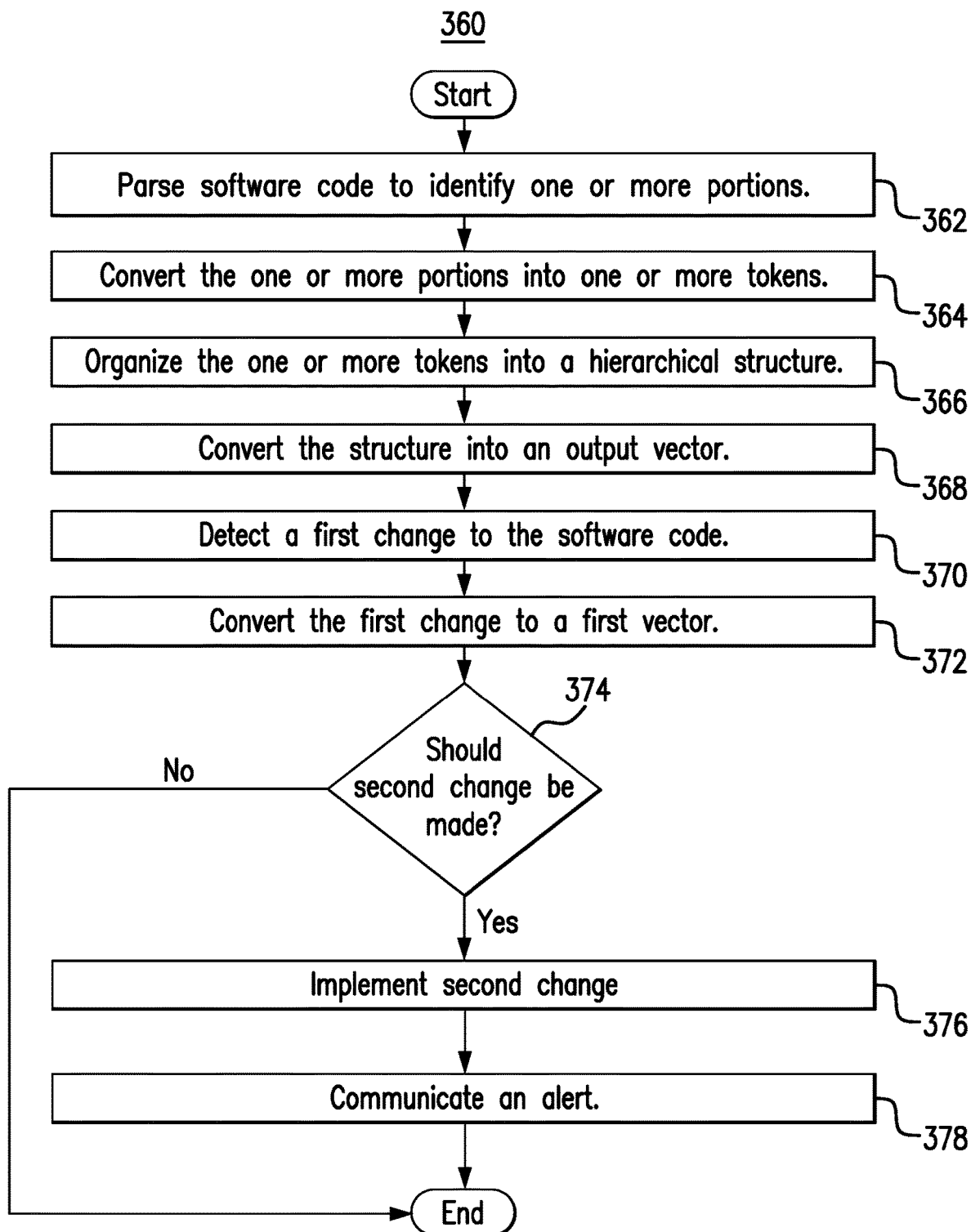

FIGS. 3A through 3C are flowcharts illustrating methods 300, 320, and 360 of using the code converter 110 of the system 100 of FIG. 1. Generally, code converter 110 performs the steps of method 300, 320, and 360. In particular embodiments, by performing methods 300, 320, and/or 360, code converter 110 improves the operation of software code 118 when executed by detecting and/or resolving conflicts and/or redundancies.

FIG. 3A is a flowchart illustrating a method 300 of vectorizing software code 118 and/or changes 128. Generally, code converter 110 vectorizes software code 118 and/or changes 128 by tokenizing software code 118 and/or changes 128 and then arranging the tokens into an hierarchical structure. Code converter 110 then converts the hierarchical structure into one or more vectors, which are used to produce an output vector. In particular embodiments, by vectorizing software code 118 and/or changes 128, code converter 110 can detect and/or resolve conflicts and/or redundancies.

Code converter 110 begins by parsing software code 118 to identify one or more portions 202A in step 302. Code converter 110 then converts the one or more portions 202A into one or more tokens 120A in step 304. Each token 120A may include a numerical representation of a portion 202A of software code 118. In step 306, code converter 110 organizes the one or more tokens 120A into a hierarchical structure 122A with one or more layers 204A. Code converter 110 then determines whether a layer 204A is noise in step 308. In particular embodiment, code converter 110 may apply a noise identification model 210 to the layers 204A to determine whether a layer 204A is noise. If the layer 204A is noise, code convert 110 removes that layer 204A from further consideration in step 310. In step 312, code converter 110 converts the remaining layers 204A into vectors 124A. In step 314, code converter 110 determines whether a vector 124A is an outlier. In particular embodiments, code converter 110 determines whether a vector 124A is an outlier by examining distances 212 between the vectors 124A. A vector 124A that is a great distance 212 from the remaining vectors 124A may be considered an outlier. If a vector 124A is an outlier, code converter 110 removes the outlier vector 124A in step 316. In step 318, code converter 110 generates an output vector 126A based on the remaining vectors 124A. In particular embodiments, code converter 110 generates output vector 126A by averaging the remaining vectors 124A. In some embodiments, code converter 110 generates output vectors 126A by taking the maximum or minimum of the remaining vectors 124A.

FIG. 3B is a flowchart illustrating a method 320 of detecting and resolving conflicts. Generally, code converter 110 performs the steps of method 320. In particular embodiments, by performing method 320, code converter 110 improves the operation of software code 118 by detecting and resolving conflicts during development of software code 118.

Code converter 110 parses software code 118 to identify one or more portions 202A in step 322. In step 324, code converter 110 converts the one or more portions 202A into one or more tokens 120A. The tokens 120A include a numerical representation of the one or more portions 202A. Code converter 110 then organizes the one or more tokens 120A into a hierarchical structure 122A in step 326. In step 328, code converter 110 converts the structure 122A into an output vector 126A. This conversion may be done using the process described using FIGS. 1, 2A, and 3A.

In step 330, code converter 110 detects a first change 128A to the software code 118. Code converter 110 converts the first change 128A to a first vector 126B in step 332. This conversion may be done by following the process described using FIGS. 1, 2A, and 3A. In step 334, code converter 110 detects a second change 128B to the software code 118. Code converter 110 then converts second change 128B to a second vector 126C in step 336. This conversion may be done by following the process described using FIGS. 1, 2A, and 3A.

In step 338, code converter 110 determines whether a conflict 214 exists between the first change 128A and the second change 128B. The conflict 214 may arise because the changes 128A and 128B are different and conflicting changes to the same portion of software code 118. If code converter 110 determines that conflict 214 exists, code converter 110 prevents the second change 128B from being implemented in step 340. In certain embodiments, code converter 110 prevents the second change 128B from being implemented until the first change 128A has been implemented and software code 118 has been stored back into repository 108. In step 342, code converter 110 communicates an alert 216 that indicates the detected conflict 214. In this manner, users 102 that are developing changes 128A and 128B may be notified of the detected conflict 214.

FIG. 3C is a flowchart illustrating a method 360 of detecting and resolving redundancies during the development of software code 118. Generally, code converter 110 performs the steps of method 360. In particular embodiments, code converter 110 improves the operation of software code 118 by detecting and resolving redundancies during the development of software code 118.

Code converter 110 begins by parsing software code 118 to identify one or more portions 202A in step 362. In step 364, code converter 110 converts the one or more portions into one or more tokens 120A. The tokens 120A include numerical representations of the one or more portions 202A. In step 366, code converter organizes the one or more tokens 120A into a hierarchical structure 122A. In particular embodiments, code converter 110 uses a neural network to analyze and organize the tokens 120A into the hierarchical structurer 122A. In step 368, code converter 110 converts the structure 122A into an output vector 126A. This conversion may be performed by following the process described using FIGS. 1, 2A, and 3A.

In step 370, code converter 110 detects a first change 128A to the software code 118. In step 372, code converter 110 converts the first change 128A to a first vector 126B. This conversion process may be performed using the process described using FIGS. 1, 2A, and 3A. In step 374, code converter 110 determines whether a second change 128B should be made. For example, code converter 110 may compare distances 212 between vectors 126 to determine whether change 128A is to a feature that is implemented elsewhere in software code 118 and should therefore also be changed. If a second change 128B should be made, code converter 110 implements the second change 128B in step 376. In step 378, code converter 110 communicates an alert 216A indicating that the corresponding change should be made.

Modifications, additions, or omissions may be made to methods 300, 320, and 360 depicted in FIGS. 3A-3C. Methods 300, 320, and 360 may include more, fewer, or other steps. For example, steps may be performed in parallel or in any suitable order. While discussed as code converter 110 performing the steps, any suitable component of system 100, such as device(s) 104 for example, may perform one or more steps of the methods.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An apparatus comprising:
a memory; and
a hardware processor communicatively coupled to the memory, the hardware processor configured to:
parse software code for a software application to identify a plurality of portions of the software code;
convert the plurality of portions of the software code into a plurality of tokens that form a numerical representation of the software code;
organize, using a neural network, the plurality of tokens into a hierarchical structure that represents the software code;
convert the structure into an output vector comprising a numerical representation of the software code, wherein:
converting the structure into the output vector comprises converting a plurality of layers of the hierarchical structure into a first plurality of vectors; and
the output vector is an average, the minimum, or the maximum of the first plurality of vectors;
detect a first change to a particular feature coded in a first portion of the software code;
convert the first change to a first vector comprising a numerical representation of the first change, wherein:
converting the first change to the first vector comprises converting a plurality of portions of the first change into a second plurality of vectors; and the first vector is an average, the minimum, or the maximum of the second plurality of vectors;

detect a second change to the software code;

convert the second change to a second vector comprising a numerical representation of the second change;

determine a first distance between the first vector and the output vector;

determine a second distance between the second vector and the output vector;

determine a third distance between the first vector and the second vector;

compare the determined distances;

in response to determining that the third distance between the first vector and the second vector is greater than a first threshold, the first distance between the first vector and the output vector is less than a second threshold, and the second distance between the second vector and the output vector is less than the second threshold:

determine that the first change and the second change are conflicting changes;

resolve the conflict between the first change and the second change by preventing the second change from being implemented in the software code until the first change has been implemented in the software code; and communicate an alert that the second change should not be made to the software code.

2. The apparatus of claim 1, wherein the hardware processor is further configured to:

identify noise in training software code comprising a code portion and a noise portion to produce a noise identification model, the noise portion stochastically added to the code portion to form the training software code;

identify a portion of the structure as noise based on the noise identification model; and remove the identified portion from the structure.

3. The apparatus of claim 1, wherein the hardware processor is further configured to convert the output vector into the software code.

4. The apparatus of claim 1, wherein the hardware processor is further configured to:

detect a third change to the software code;

convert the third change to a third vector comprising a numerical representation of the third change;

determine, based on the output vector, the first vector, and the third vector, that the first change and the third change are redundant; and in response to determining that the first and third changes are redundant, prevent the third change from being implemented.

5. A method comprising:

parsing, by a hardware processor communicatively coupled to a memory, software code fora software application to identify a plurality of portions of the software code;

converting, by the hardware processor, the plurality of portions of the software code into a plurality of tokens that forma numerical representation of the software code;

organizing, by the hardware processor and using a neural network, the plurality of tokens into a hierarchical structure that represents the software code;

converting, by the hardware processor, the structure into an output vector comprising a numerical representation of the software code, wherein:

converting the structure into the output vector comprises converting a plurality of layers of the hierarchical structure into a first plurality of vectors; and the output vector is an average, the minimum, or the maximum of the first plurality of vectors;

detecting, by the hardware processor, a first change to a particular feature coded in a first portion of the software code;

converting, by the hardware processor, the first change to a first vector comprising a numerical representation of the first change, wherein:

converting the first change to the first vector comprises converting a plurality of portions of the first change into a second plurality of vectors; and the first vector is an average, the minimum, or the maximum of the second plurality of vectors;

detecting a second change to the software code;

converting the second change to a second vector comprising a numerical representation of the second change;

determining a first distance between the first vector and the output vector;

determining a second distance between the second vector and the output vector;

determining a third distance between the first vector and the second vector;

comparing the determined distances;

in response to determining that the third distance between the first vector and the second vector is greater than a first threshold, the first distance between the first vector and the output vector is less than a second threshold, and the second distance between the second vector and the output vector is less than the second threshold:

determining that the first change and the second change are conflicting changes;

resolving the conflict between the first change and the second change by preventing the second change from being implemented in the software code until the first change has been implemented in the software code; and communicating an alert that the second change should not be made to the software code.

6. The method of claim 5, further comprising:

identifying, by the hardware processor, noise in training software code comprising a code portion and a noise portion to produce a noise identification model, the noise portion stochastically added to the code portion to form the training software code;

identifying, by the hardware processor, a portion of the structure as noise based on the noise identification model; and removing, by the hardware processor, the identified portion from the structure.

7. The method of claim 5, further comprising converting, by the hardware processor, the output vector into the software code.

8. The method of claim 5, further comprising:

detecting, by the hardware processor, a third change to the software code;

converting, by the hardware processor, the third change to a third vector comprising a numerical representation of the third change;

determining, by the hardware processor and based on the output vector, the first vector, and the third vector, that the first change and the third change are redundant; and in response to determining that the first and third changes are redundant, preventing, by the hardware processor, the third change from being implemented.

9. A non-transitory computer-readable medium storing instructions that when executed by a processor cause the processor to:
parse software code fora software application to identify a plurality of portions of the software code;
convert the plurality of portions of the software code into a plurality of tokens that form a numerical representation of the software code;
organize, using a neural network, the plurality of tokens into a hierarchical structure that re presents the software code;
convert the structure into an output vector comprising a numerical representation of the software code, wherein:
converting the structure into the output vector comprises converting a plurality of layers of the hierarchical structure into a first plurality of vectors; and
the output vector is an average, the minimum, or the maximum of the first plurality of vectors;
detect a first change to a particular feature coded in a first portion of the software code;
convert the first change to a first vector comprising a numerical representation of the first change, wherein:
converting the first change to the first vector comprises converting a plurality of portions of the first change into a second plurality of vectors; and
the first vector is an average, the minimum, or the maximum of the second plurality of vectors;
detect a second change to the software code;
convert the second change to a second vector comprising a numerical representation of the second change;
determine a first distance between the first vector and the output vector;
determine a second distance between the second vector and the output vector;
determine a third distance between the first vector and the second vector;
compare the determined distances;
in response to determining that the third distance between the first vector and the second vector is greater than a first threshold, the first distance between the first vector and the output vector is less than a second threshold, and the second distance between the second vector and the output vector is less than the second threshold:
determine that the first change and the second change are conflicting changes;
resolve the conflict between the first change and the second change by preventing the second change from being implemented in the software code until the first change has been implemented in the software code; and
communicate an alert that the second change should not be made to the software code.

10. The non-transitory computer-readable medium of claim 9, wherein the instructions when executed by the processor, further cause the processor to:
identify noise in training software code comprising a code portion and a noise portion to produce a noise identification model, the noise portion stochastically added to the code portion to form the training software code;
identify a portion of the structure as noise based on the noise identification model; and
remove the identified portion from the structure.

11. The non-transitory computer-readable medium of claim 9, wherein the instructions when executed by the processor, further cause the processor to convert the output vector into the software code.

12. The non-transitory computer-readable medium of claim 9, wherein the instructions when executed by the processor, further cause the processor to:
detect a third change to the software code;
convert the third change to a third vector comprising a numerical representation of the third change;
determine, based on the output vector, the first vector, and the third vector, that the first change and the third change are redundant; and
in response to determining that the first and third changes are redundant, prevent the third change from being implemented.

* * * * *